(12) United States Patent
Monahan et al.

(10) Patent No.: US 9,083,748 B2
(45) Date of Patent: Jul. 14, 2015

(54) MODELLING NETWORK TO ASSESS SECURITY PROPERTIES

(75) Inventors: Brian Quentin Monahan, Bristol (GB); Adrian John Baldwin, Bristol (GB); Simon Kai-Ying Shiu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3034 days.

(21) Appl. No.: 11/302,637

(22) Filed: Dec. 14, 2005

(65) Prior Publication Data

US 2007/0136788 A1    Jun. 14, 2007

(30) Foreign Application Priority Data

Dec. 16, 2004 (GB) .................................. 0427679.6
Mar. 22, 2005 (GB) .................................. 0505784.9

(51) Int. Cl.
*H04L 29/00* (2006.01)
*H04L 29/06* (2006.01)

(52) U.S. Cl.
CPC ...................................... *H04L 63/20* (2013.01)

(58) Field of Classification Search
USPC ................... 726/23, 28; 395/200.17; 713/201
See application file for complete search history.

(56) References Cited

U.S. PATENT DOCUMENTS

| | | | |
|---|---|---|---|
| 5,550,984 A * | 8/1996 | Gelb .............................. | 709/245 |
| 6,330,562 B1 | 12/2001 | Boden et al. | |
| 6,535,227 B1 * | 3/2003 | Fox et al. ...................... | 715/736 |
| 2003/0177390 A1 * | 9/2003 | Radhakrishnan ............. | 713/201 |
| 2003/0182585 A1 | 9/2003 | Park et al. | |
| 2003/0195861 A1 | 10/2003 | McClure et al. | |

(Continued)

FOREIGN PATENT DOCUMENTS

| | | |
|---|---|---|
| WO | WO-0005650 A1 | 2/2000 |
| WO | WO-0070463 A1 | 11/2000 |
| WO | WO-0160024 A2 | 8/2001 |

OTHER PUBLICATIONS

GB Patent Office, Appl. No. GB 0505784.9, GB Search Report, 3pp, Aug. 9, 2005.

(Continued)

*Primary Examiner* — Brandon Hoffman
*Assistant Examiner* — Michael D Anderson
(74) *Attorney, Agent, or Firm* — Cutforths Intellectual Property Consultants; Peter Cutforth

(57) ABSTRACT

A method of assessing a network uses a model (450) having nodes (100, 110) to represent parts of the network infrastructure and the application services, and having links to represent how the nodes influence each other. Dependencies or effects of the application services are found by determining paths through the nodes and links of the model (530). Such assessment can be useful for design, test, operations, and diagnosis, and for assessment of which parts of the infrastructure are critical to given services, or which services are dependent on, or could have an effect on a given part of the infrastructure. The dependencies or effects can encompass reachability information. The use of a model having links and nodes can enable more efficient processing, to enable larger or richer models. What changes in the dependencies or effects result from a given change in the network can be determined (830).

25 Claims, 7 Drawing Sheets

(56) References Cited

U.S. PATENT DOCUMENTS

| | | | |
|---|---|---|---|
| 2004/0221027 A1 | 11/2004 | Parrott | |
| 2005/0008001 A1 | 1/2005 | Williams | |
| 2005/0166267 A1* | 7/2005 | Pietilainen et al. | 726/23 |
| 2005/0216956 A1* | 9/2005 | Orr et al. | 726/23 |
| 2005/0235363 A1* | 10/2005 | Hibbard et al. | 726/28 |
| 2005/0251573 A1* | 11/2005 | Merkow et al. | 709/226 |

OTHER PUBLICATIONS

UK Intellectual Property Office, Appl. No. 200500366-2 GB, Examination Report, 4pp, dated Sep. 19, 2008.

UK Intellectual Property Office, Appl. No. 200500356-2 GB Examination Report, 4pp, dated May 6, 2009.

\* cited by examiner

Figure 4
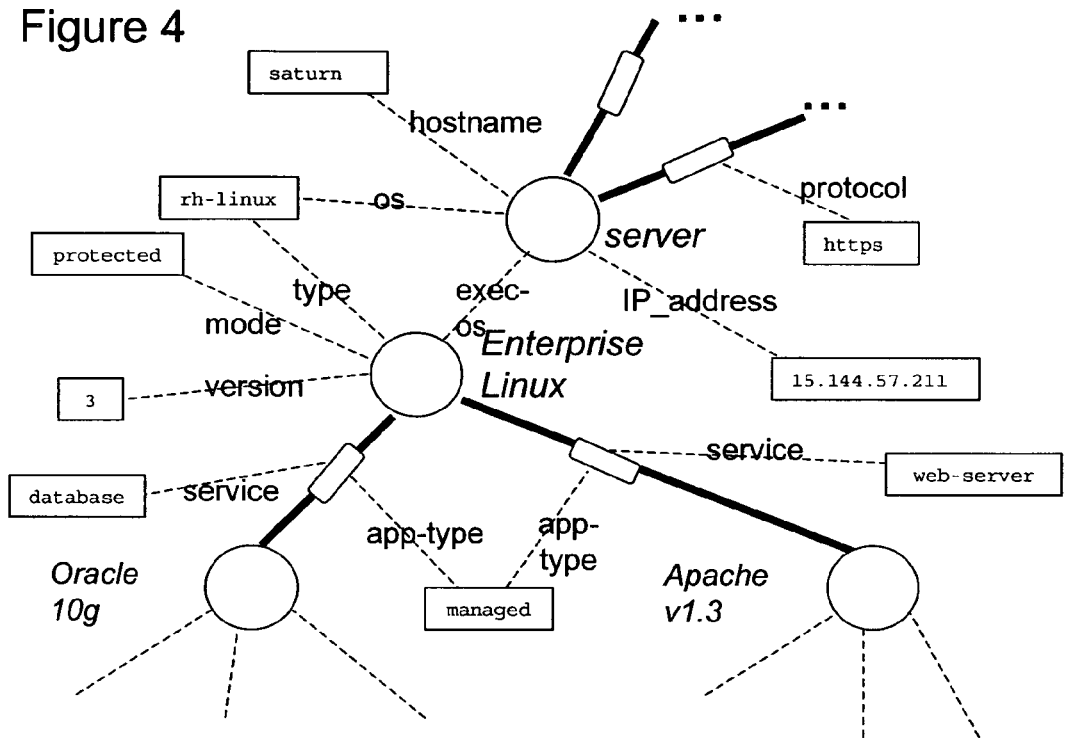
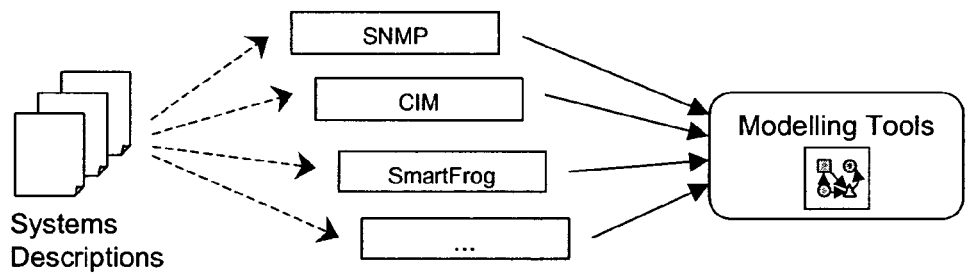
Figure 5

MODELLING NETWORK TO ASSESS SECURITY PROPERTIES

PRIORITY REFERENCE TO FOREIGN APPLICATIONS

This application is a Utility Application of and claims priority to United Kingdom Patent Application No. 0505784.9, filed on Mar. 22, 2005, and entitled "MODELLING NETWORK TO ASSESS SECURITY PROPERTIES," abandoned, and United Kingdom Patent Application No. 0427679.6, filed on Dec. 16, 2004, and entitled "SECURITY MODELLING FOR INFORMATION TECHNOLOGY SYSTEMS," expired. These applications are incorporated by reference in their entirety.

FIELD OF THE INVENTION

The invention relates to methods of assessing networks and to corresponding software, networks and systems.

BACKGROUND

Networks such as communications networks, also called IT (information technology) infrastructures, are difficult to manage. Changing the network configuration, by changing topology, or adding a new machine or storage device, or changing attributes of such devices for example, are typically difficult manual tasks. This makes such changes expensive and error prone. It also means that the change can take several hours or days to take place, limiting the rate at which reconfiguration can take place to take account of changing business demands.

A physical IT infrastructure can have only one configuration at any one time. It may be used for multiple tasks, which should not interfere with each other. Such sharing can be between different owners (companies), or tasks or data belonging to the same owner but having differing priorities or sensitivities. For example, it has been proposed to use spare compute cycles on desktops and servers to perform large scale computations: grid applications. One problem is network security, in particular how to isolate the network traffic, the data storage and processing of these computations from other tasks using the same infrastructure. Without isolation undesirable interference between the tasks is likely to occur rendering such sharing an unacceptable risk.

In most physical IT infrastructure, resource utilization is very low: 15% is not an uncommon utilization for a server, 5% for a desktop. This provides impetus to share such IT infrastructure. HP's UDC (Utility Data Centre) is an example of how to manage such sharing, by automatic reconfiguration of physical infrastructure: processing machines, network and storage devices. This requires specialized hardware which makes it expensive. In addition in the UDC a physical machine can only ever be in a single physical infrastructure. This means that all programs running on that physical machine will be exposed to the same networking and storage environment: there is a risk they can interfere with each other and the configuration may not be optimal for all programs. Models of topologies of such shared networks can be built up by "network discovery" programs to facilitate network management.

Advanced, multi-customer, utility-style distributed systems will be deployed and managed, in an ever-changing dynamic business-driven environment, by making use of explicit systems descriptions, such as provided via languages and notations like CIM, SmartFrog, etc. These in turn embody various lightweight logical models of these systems. Since utility-style IT systems are developed to serve well-defined business functions, there are typically several valued information assets and services located with the system. Access to these valued resources should be restricted to entities having an accepted business need.

It is also known to provide model-based techniques for exploring the consequences of failures etc in communications networks and in other types of network such as manufacturing plants, product distribution chains, or utility distribution networks for example. Textbooks on Probability Risk Assessment give semantic network descriptions of plant. However, that is not the same thing as using the model to actively locate and explore the consequences of failures and malicious exploits of vulnerabilities for attack—typically, event and fault tree analyses are employed to do that.

It is known to provide automatic management of security policy in communications networks. Telcordia have deployed an agent based system for automatic configuration of firewalls to enforce security policies specifying that some machines should be connected and others should not be connected in a network having a dynamic topology. This involves using a model of the network topology which will be updated as the network topology is altered. The model includes information about the settings or configuration of security controls in the form of configurable firewalls at various places in the network. A drawback of this is that changes in network topology are not the only source of risk of compromises in security or isolation. Hence in practice the level of confidence provided by such a system is not high enough.

QuinetiQ have produced a network modelling tool for domain based security and compromise path analysis. This can compute compromise paths and produce tables for use by expert risk analysts. However, again it does not assess many types of risks to security including isolation, so again in practice the level of confidence provided by such a tool is not high enough.

Microsoft have announced a system definition model (SDM) which is used to create definitions of distributed systems. The distributed system is defined as a set of related software and hardware resources working together to accomplish a common function. Multitier line-of-business (LOB) applications, Web services, e-commerce sites, and enterprise data centers are examples of systems. Using SDM, businesses can create a live blueprint of an entire system including application services, hosts for such services, network topologies and underlying hardware. This blueprint can be created and manipulated with various software tools. It can be used to define system elements and capture data pertinent to development, deployment, and operations so that the data becomes relevant across the entire IT life cycle.

SUMMARY OF THE INVENTION

In one aspect the invention provides:

A method of using a data model of a network infrastructure, the model having nodes to represent parts of the network infrastructure, and having links to represent how the nodes influence each other, and the method having the steps of making a representation in the model of one or more alterations in the network infrastructure, and automatically deriving from the model either: changes in security properties of the network infrastructure resulting from the alteration; or alterations in the network infrastructure which can enable a given change in the security properties.

An additional feature of some embodiments is:

The method having the step of determining paths through the nodes and links of the model.

An additional feature of some embodiments is:

The model having a representation of application services arranged to use the network infrastructure, and the method having the step of deriving changes in the security properties resulting from a given alteration in the network infrastructure or in the application services.

Another such additional feature of some embodiments is:

The method having the steps of using the model to assess candidate alterations to the network infrastructure or application services to enable a given security property.

Another such additional feature of some embodiments is:

The method having the steps of determining the security properties before making the given alteration in the model of the network infrastructure or application services, then repeating the determining of the security properties, and comparing these properties to derive the changes.

Another such additional feature of some embodiments is:

The step of making the representation of the alterations having the step of creating at least a second instance of the model, having a representation of one or more candidate alterations, and the step of deriving the changes having the steps of determining the security properties from the instances, then comparing these properties.

Another such additional feature of some embodiments is:

The security properties comprising any of the following; what parts of the network are reachable from a given point or part of the network with an existing configuration, what parts of the network are reachable from a given point or part of the network if the configuration is altered, what security controls exist between given points or regions of the network, and what security controls exist in new paths created between given points or regions of the network if the configuration is altered.

Another such additional feature of some embodiments is:

The model comprising a database of object oriented elements representing the nodes, and the method having the step of searching the database for logical paths through the model, which match given constraints.

Another such additional feature of some embodiments is:

The database having object oriented elements representing the links.

Another such additional feature of some embodiments is:

The method having the step of creating an object representing at least one logical path through two or more links of the model.

Another such feature of some embodiments is:

The searching comprising making a recursive query of the database.

Another such additional feature of some embodiments is:

The method having any of the steps of: receiving and classifying information about the network infrastructure or application services, to add to the model, and normalizing a path query with reference to class definitions of the model.

Another such feature is a computer program arranged to carry out the methods.

Another feature is a network having a network infrastructure, and the computer program for using the model.

Another aspect of the invention provides:

A method of using a data model of a network infrastructure and of application services arranged to use the network infrastructure, the model having nodes to represent parts of the network infrastructure and the application services, and having links to represent how the nodes influence each other, and the method having the steps of finding paths through the nodes and links of the model, and automatically deriving security properties of at least the application services from the determined paths.

An additional feature of some embodiments is:

The method having the steps of using the model to derive changes in the security properties resulting from a given alteration in either the network infrastructure or the application services.

Another such additional feature of some embodiments is:

The step of deriving the changes in the security properties having the steps of determining the security properties before making a representation in the model of the given alterations in either the network infrastructure or the application services, then repeating the determining of security properties, and comparing these properties.

Another such additional feature of some embodiments is:

The security properties comprising any of the following; what parts or regions of the network infrastructure or application services are reachable from a given point or part of the network infrastructure or application services with an existing configuration, what parts or regions are reachable if the configuration is altered, what security controls exist between given points or regions, what security controls exist in new paths created between given points or regions if the configuration is altered, reachability of a given application service, and effect of a given application service on reachability of other parts.

Another such additional feature of some embodiments is:

The model having an indication of criticality of a node or link to a given one or more of the application services, and the step of determining security properties comprising any of; determining which nodes or links to include in a search of the model, according to the indication of criticality, determining which nodes and links in the model can be affected by a given one or more of the application services, and sorting the security properties according to the indication of criticality.

Another such additional feature of some embodiments is:

The model comprising a database of object oriented elements representing the nodes, and the method having the step of searching the database for logical paths through the model, which match given constraints.

Another such additional feature of some embodiments is:

The database having object oriented elements representing the links.

Another such additional feature of some embodiments is:

The method having the step of creating an object representing at least one logical path through two or more links of the model.

Another such feature of some embodiments is:

The searching comprising making a recursive query of the database.

Another such additional feature of some embodiments is:

The method having any of the steps of: receiving and classifying information about the network infrastructure or application services, to add to the model, and normalizing a path query with reference to class definitions of the model.

Another such additional feature of some embodiments is:

A computer program arranged to carry out the method.

A network having a network infrastructure and application level services, and the computer program.

A database having a model of at least some of a network, the model having nodes to represent parts of the network infrastructure and the application services, and having links to represent how the nodes influence each other, arranged such that dependencies or effects of the application services can be determined from paths through the nodes and links of the model.

Another aspect of the invention provides:

A method of assessing a network infrastructure or application services, the method having the step of providing a model having nodes to represent parts of the network infrastructure and application services, and having links to represent how the nodes influence each other, and the method having the step of assessing security properties of the network infrastructure by determining paths through the nodes and links of the model, at least the links being represented by object oriented elements.

Any of the additional features can be combined together, and combined with any of the aspects, as would be apparent to those skilled in the art. The embodiments are examples only, the scope is not limited by these examples, and many other examples can be conceived within the scope of the claims.

BRIEF DESCRIPTION OF THE FIGURES

Specific embodiments of the invention will now be described, by way of example, with reference to the accompanying Figures, in which:

FIGS. 2, 3 and 4 shows a model of parts of a network

FIG. 5 shows schematically how a number of different system description mechanisms can be used to build up the model, according to an embodiment.

DESCRIPTION OF SPECIFIC EMBODIMENTS

Figure 1:
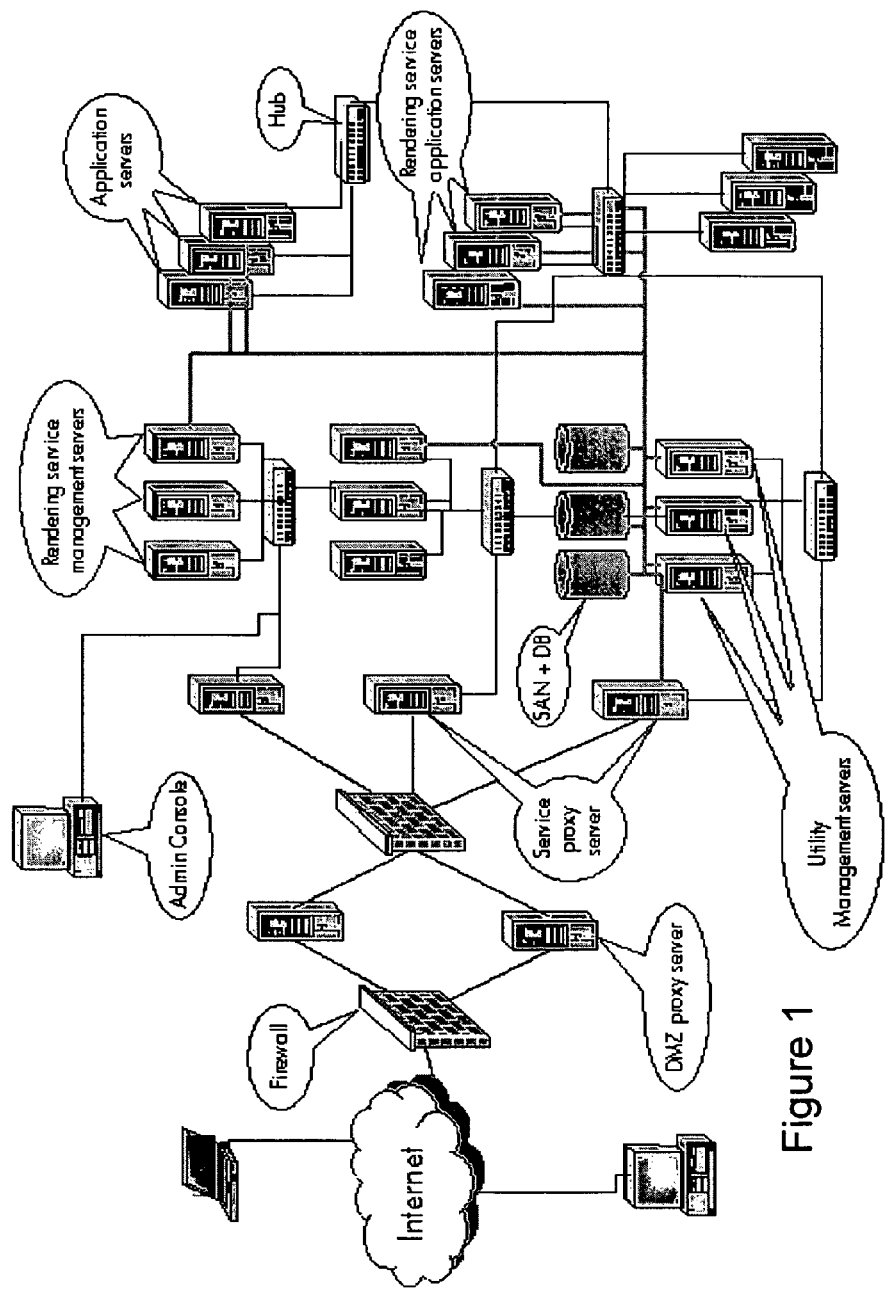
FIG. 1 shows an example of parts of a network.

In some of the embodiments described below, change information can be derived which may be more valuable and concise than the raw information without the changes being highlighted. Particularly for larger networks there can be so much raw information that such changes are difficult or impossible for a user to discern. A consequence is that users and operators can be much more confident about making changes to the network if the implications for reachability can be predicted, or at least diagnosed. This can also enable a warning or other subsequent or pre-emptive action if a proposed change will affect reachability of business critical parts of the network for example. Such deriving of changes in security properties or alterations in network infrastructure can be useful for design, test, operations, and diagnosis amongst others. It can enable for example determining which parts of the infrastructure are critical to given services, or which services are dependent on, or could have an effect on a given part of the infrastructure. The security properties can encompass dependencies or effects and reachability information, such as whether a given application service can access a resource such as a database, and what intermediate resources are required to maintain or restrict that access. The methods can derive changes in security properties without assessing alterations, and vice versa, or do both.

Having multiple candidate alterations can enable quicker or more reliable optimisation of the network by an empirical type process, for example by trying and comparing effects on the given property of candidate alterations in the network. This is particularly useful as networks become more complex and their security properties such as reachability and dependencies become harder to predict.

A convenient way of deriving the changes in security properties involves determining the security properties before making the given alteration in the model of the network infrastructure or application services, then repeating the determining of the security properties, and comparing these properties. It can be repeated for a series of staged changes, so that assessments of intermediate states after each stage of the changes can be carried out. This can enable temporary vulnerabilities to be found. The security properties can encompass any of the following; what parts of the network are reachable from a given point or part of the network with an existing configuration, what parts of the network are reachable from a given point or part of the network if the configuration is altered, what security controls exist between given points or regions of the network, and what security controls exist in new paths created between given points or regions of the network if the configuration is altered.

These are some of the security assessments which are commercially significant, others are conceivable. Again, the information determined can encompass changes in reachability, to highlight the effects of changes in the network. This is particularly useful in cases where there is a business risk in allowing access to a given resource, so it is important to be aware of any new paths. It can also be useful in cases where there is a business risk if access to a given resource is lost, and it is important to be aware of any lost paths.

The model can comprise a database of object oriented elements representing the nodes, and the method can have the step of searching the database for logical paths through the model, which match given constraints. This can be more efficient computationally than other techniques such as conventional flat file databases, particularly where there are a large number of possible paths (e.g. where the number of logical nodes >100).

The database can have object oriented elements representing the links. This can be more efficient computationally than other techniques which represent links less directly, as attributes of objects representing nodes for example.

This can enable creating an object representing at least one logical path through two or more links of the model, to enable more efficient processing than having the paths represented merely by attributes of objects representing the nodes for example. Such objects can be part of the model, or can be created temporarily as part of a search for example.

Encoding and retaining path information with the model in the database is preferable because the particular path information that results as an outcome from path queries can be suitably retained for combination with future queries and for comparison purposes. This can aid efficiency as it helps avoid re-computation of path information repeatedly from the model directly. When the model is updated or changed, it is also possible to recalculate corresponding paths as necessary to maintain consistency. Given the typically large quantity of path information, it is typically infeasible to retain all the path information for a particular network model. However a selective retention of said path information provides an opportunity to trade-off dynamic regeneration of paths against retention.

The searching can comprise making a recursive query of the database. Such queries are usually difficult or impossible to carry out on databases using standard query languages and must be substituted with numerous non recursive queries. Thus considerable simplification can be achieved by a recursive query, which enables the parameters of the search to be altered as partial results are obtained.

The model can be generated or maintained by receiving and classifying information about the network infrastructure or application services, to add to the model, and normalizing a path query with reference to class definitions of the model. This classifying can help enable the model to contain consistent information and to enable missing information to be inferred. The normalizing can help enable checking of such queries for consistency with the model, and infer missing information for example. Determining security properties of any of the application services or network infrastructure can involve determining paths through the nodes and links of the model. Again, such assessment can be useful for design, test, operations, and diagnosis amongst others. It can enable for example assessment of which parts of the infrastructure are critical to given services, or which services are dependent on, or could have an effect on a given part of the infrastructure. The use of a model having links and nodes can enable more efficient processing, which can enable larger or richer models. The assessment can be commercially valuable, for example to increase confidence in assurance of services on shared infrastructure to reduce infrastructure costs. Other advantages will be apparent to those skilled in the art, particularly over other prior art.

The embodiments can have a number of effects arising from taking into account services above the network layer, in providing assurance of services for users for example. Firstly, an assessment of risks to critical application services can be more complete if it can encompass the effects of such services. This can increase confidence of users, and facilitate outsourcing and sharing of resources to reduce costs. Secondly the security assessment can determine the security critical components (if any) that occur upon access routes to these assets. This applies whether it is critical to maintain access, or critical to prevent access. Again this assessment can be made with more confidence by including effects of application services. This can help the service provider prioritize network maintenance efforts for example. Thirdly it can enable more complete investigation of security consequences of architectural, topological and configuration changes to the system (e.g. what-if style of analysis) in a safe and cost-effective manner, without endangering the operational, live system directly or causing unnecessary disruption to its current operation. This can be predictive, real time, or in retrospect (forensic) for example. Fourthly, inclusion of application services can facilitate more efficient assessment by enabling reduction of the numbers of paths being searched, by selection of paths which are more relevant to such services.

Network infrastructure is defined as the hardware and software needed to host application services, and is intended to encompass the actual hardware and software, or a design for all or part of it, which can be modelled and assessed before implementation. Such infrastructure typically includes the hardware processing engine itself, the operating systems and any systems libraries and utilities needed by the application services. However, the infrastructure may also preferentially incorporate virtualization technology (e.g. VMware, MS Virtual Server) that can permit multiple operating system instances (in the form of virtual machines) to run potentially concurrently and simultaneously on processing hardware. These virtual machines will themselves contain other systems and user programs that can then internally execute as multi-tasking processes, within each virtual machine. The processing hardware may also consist of one or more processing units that operate as a single clustered entity from the customer's point of view. Network layer services capable of implementing or altering network paths can include routers, security controls such as firewalls, DNS (Domain name services), directory services such as LDAP (lightweight directory access protocol, which is typically a key corporate database for locating people and systems), gateways to external networks, services such as SANs (Storage Area Network), VLAN (Virtual Local Area Network) VPNs (Virtual Private Network), and operating systems. Application services can include web servers, user business applications such as on-line retailing, banking, distribution or plant or utility management, and so on. The assurance can be fully automated, or partly automated to provide assistance to human operators of a network for example.

For the sake of clarity, the notions of association, dependency and relationship will be explained:

Association: An association between two objects is a general property that links these objects or entities together. Associations are typically symmetric, although they don't have to be. Associations may have additional attributes that can further qualify the relationship that the association represents between the two objects so linked.

Dependency: A dependency is an asymmetric link between two or more objects. Saying that object A depends upon (a set of) objects B often implies that changing (any of) the objects B will affect object A. The dependency relationship is often that object A requires the presence/existence of objects B e.g. existence of children depend upon their parents having existed. Thus, if A depends upon B, then we may say that B is required or needed by A. The asymmetry of the relationship implied here is often a strong one. We would typically require that dependencies are typically acyclic—not allowing a cycle of relationships. A chain such as: A depends upon B, which depends on C, which depends on D and which then depends on some preceding element, say B, would not be allowed. Note that acyclicity is more restrictive than mere asymmetry: acyclicity forbids cycles of arbitrary sizes, whereas asymmetry on its own only forbids cycles of size two. Dependency is easily illustrated—a particular order-entry processing service may depend upon a network connection to a particular back-end server, which is running a particular database system. Access to this particular system will depend in turn upon the authentication and authorization servers, and that these are working, are configured correctly and have an up-to-date record of access control credentials and so on. Closely connected concepts to dependency are the notions of parameter and parameterization. Parameters are entities that are capable of characterizing or controlling some dependant object or entity. Parameters may themselves be dependant upon still more primitive entities. Identification of the significant independent parameters of a system is an important part of specifying, controlling and managing that system.

Relationship: A relationship is information that links several objects (at least two) together. Both association and dependency/parameter are kinds of relationship. Relationships may be:

direct (i.e. given immediately in terms of an simple attribute value) or indirect (i.e. given in terms of a combination of values and calculated quantities).

explicit (i.e. given by a specific formula) or implicit assumed (i.e. assumed to hold), given (i.e. known to hold) or derived (i.e. shown to hold).

Dependencies and parameterization of and by objects will typically not be directly definable in terms of the attributes of components of a system. Their role/significance will typically be derived from the way that the systems are constructed and composed. Object B is accessible by object A if there exists a sequence of objects beginning with A and linked together in some manner to finish with object B. Thus, being accessible is an example of a symmetric binary relationship and an association.

Object B is reachable by object A via path P if the path P is a sequence of objects linked together in some defined way, starting with object A and ending with object B. Thus, being reachable is a relationship between the objects A and B and also the path P. Technically, reachable is not symmetric—it is not an association, since it includes the path P.

Note that reachability itself also means a particular way or method of deducing (or inferring) a relationship between two objects in terms of finding a path or sequence of links between two objects. Note that there are other ways of inferring relationships between objects besides using reachability in a direct manner, such as solely by logical inference and computation, etc.

A network connection between a web service and a desktop client may in some cases be an accessibility connection, meaning the particular path actually taken to establish that connection is immaterial. Indeed the path may be instantaneously and continually changing (c.f. packet-switching networks), and yet the same connection between endpoints is maintained.

For security purposes, however, the customer may require that all connections are mediated via particular firewalls and are authorised via particular authentication/authorization servers. In this case, the particular path taken is of relevance. This would be an example where it is necessary to know how two objects are connected together (i.e. they are reachable via a particular path).

Reachability can encompass conditional accessibility, in other words an indication of paths connecting given points, together with an indication of what conditions or reconfigurations along the paths could bar or alter the access, and any potential paths which could cause or deny access under given conditions. Hence it can encompass currently accessible paths and potential paths if conditions are met, such as a reconfiguration of infrastructure. Reachability can be assessed between two or more given points, or services, or to find all the points or services reachable or isolated from a given point or points.

Security properties of all or part of network infrastructure and application services can encompass dependencies, effects on other parts, reachability, security controls or other conditions affecting operation, for example.

Embodiments of the invention will now be described, some in the context of shared networks such as utility computing networks, though clearly the embodiments can be applied equally to other types. Utility Computing can involve a business contracting third-party Utility Providers to provide IT services, typically within a networked data centre environment. To do this economically, Utility Provider's will need to provide a computing environment with a high degree of automated support for their IT services and processing. The SoftUDC proposal of HP is an advanced example.

However, there is a complication. The utility network infrastructure resources (dynamically) allocated by a Utility Network Provider to their customers will typically need to access and compute over highly-valued data and other IP (intellectual property) assets owned by those customers. This potentially represents a considerable risk of exposure and compromise to the significant IP assets of any customer that tries to exploit utility computing in an effective way. Accordingly, customers will need continual assurance that their data and other IP assets are being adequately looked after and protected on their behalf. At the same time, utility providers need have the means to offer this assurance in a practical and effective manner that could entice, attract and retain customers.

Generally, distributed IT systems are composed of composite, structured devices (consisting of combined hardware and software) that are linked together via various kinds of graph or network links, such as: communications networks and protocols; hardware interconnections between systems units; software class hierarchies and other knowledge-based ontologies; functional/object decompositions into sub-systems and sub-processes; and library use relationships (API's, (Application programming interfaces, DLL's (Dynamic Link Libraries), etc.). More specifically, adaptive utility computing aims to provide computing resources as services on the basis of contractual outsourcing and rental. Such a capability enhances business agility since it means that IT resources can be made dynamically available on a commercial basis to corporate users, thus allowing IT resources to be rapidly and dynamically reallocated as demand varies (i.e. "flexing"). Furthermore, standard commoditised IT infrastructure (i.e. networking interfaces, server systems, and standard OS systems) will be used so that the customer's software configuration can be readily replicated over as many different machines as required, subject to availability. Generally, valued information assets and services can be located at various points in these complex IT systems, with a variety of different access paths and dependency links. Access to these valued resources should be provided according to accepted business need.

An example of part of a network is shown in FIG. 1, for providing high performance graphics generation applications. This shows application servers coupled to a hub, rendering service management servers, again connected to a hub, and rendering service application servers coupled to their hub. A group of utility management servers are connected to their hub, and also connected to a storage area network SAN and Database DB resources. The various parts are controllable from an admin console, and access to external networks is provided. This involves service proxy servers coupling the hubs to a first firewall. This is coupled to a second firewall via DMZ (De Militarized Zone) proxy servers. The second firewall is then coupled to the internet, to enable access via external remote PCs or laptop computers for example. This figure shows an example network, which can be modelled by embodiments of the invention, many other arrangements and applications can be envisaged, so the particular connections and devices of the network of FIG. 1 need not be described in more detail now.

To identify business need and related requirements, a risk analysis process is needed to map out organizational aspects such as data ownership and roles, rights and duties. Essentially this process determines organizational players and their responsibilities and duties for correct functioning of parts of the deployed system, its assets and services. Thus, the risk analysis identifies the assets and also which players/parties cares about them. From this information, the intended separations of duty and concerns associated with information assurance of the deployed utility system can be determined. This may help determine what the expectations of the system model should be (e.g. requirements specification of assurance).

There is a need to ensure that resource assets and services should only be made accessible to entities with accepted business need and defined purpose. Because of system complexity and the restrictions placed by outsourcing, it is not easy to see which sub-systems are defending and protecting these assets and services against illegitimate access and/or manipulation.

As no system remains fixed and unchanged for very long in an ever-changing dynamic business-driven environment, there is a constant need to adapt, upgrade and reconfigure systems in line with business needs and requirements. Another source of change is that vulnerabilities and exploits due to flaws in systems components (hardware and software) are continually being uncovered. This means that systems components will continually need to be upgraded and patched to maintain current security requirements. Unfortunately, design and configuration flaws impact all relevant systems simultaneously. However, in practice, operations will have to prioritize the fixes/patches, ensuring that those with the greatest impact of exposure/failure will get patched soonest. All of these sources of change raise the issue of how to maintain and/or adapt security access requirements for valued assets and services.

The prospect of change raises some interesting issues and questions:
   Does a particular proposed change (usually known as "flexing") create exposures of existing configurations?
   Does the new configuration have the same security characteristics as the previous one?
   In security terms, whereabouts do the configurations differ?
   If they do differ in some way, how to repair or mitigate this difference?
   If there is no repair as such, perhaps there is an approved security downgrade or migration process that has to be employed/used/applied to achieve the transition as securely as possible?
   Assuming that mature solutions to these issues and processes can be found, does this lead to further opportunities to automate still further and achieve automated security enforcement, based simply upon business needs?

Considering the specific case of utility computing, the value proposition for the different users/players first needs to be considered. Utility Computing is about creating a flexible infrastructure that could be shared between distrusting customers, whilst allowing customers to increase or decrease the amount of resources they are using as their demand varies. There will generally be a utility provider whose job it is to provide a secure, highly instrumented and trustworthy environment for their customers. Customers will be segmented into virtual infrastructures (farms) and there will be utility management machines responsible for allocating and provisioning resources (i.e. CPU and storage) into and out of these farms in a secure manner.

The basic security property required is that customers should not be able to see each others data, or even be aware of their presence. Customers should assume that several defensive measures will be used in the architecture to provide defense-in-depth for the utility itself. In particular, it should be very hard for customers to access or affect the back-end Utility Management servers.

There are a number of techniques or security controls that can be used to isolate farms, varying from strong physical separation (air-gapping), use of VLAN's and encryption, through to configuration of traditional infrastructure such as firewalls, identity management and access control mechanisms. Customers should assume that the infrastructure will already have been instrumented to the extent that that the provider will be able to gather standard statistics about resource usage, but lacking the ability to eavesdrop in detail upon the customer's activities.

Such flexibility of the IT infrastructure is likely to be attractive to Utility Providers, Service Providers and End Customers alike, because:
   Utility Providers can make their infrastructure available on a dynamic basis to different customers. Notably Utility Computing can help cut down the costs of provisioning a customer's configuration. This means that it becomes possible to provide service to a wider range of customers.
   Service Providers and End Customers can obtain, under contract, outsourced IT resources from Utility Providers upon demand. They don't need to concern themselves about systems availability or the cost of running and maintaining all of these systems—this is the responsibility of the Utility Provider.

There are several ways in which customers may choose interact with the resources put at their disposal. Here are two ways:
   1. Customers have direct access to the computational resources they have rented and utilise them directly on tasks of their own choosing. The software deployed and the data resources used may be owned and provided by the customer.
   2. Customers require a standard commodity service using standard infrastructure and configurations. The customer therefore expects this environment to be rolled out for them by the Utility Provider. The customer's sole IP is likely to reside entirely in the data that is used and generated by running the service provided by the utility.

Typically, there is a specific mechanism provided for the customer to communicate with the utility resources running on his behalf. In each case, the utility resources are deployed according to some description, such as for example a SmartFrog description—generally, advanced multi-customer utility computing systems will be described and managed using explicit systems descriptions. These descriptions support the automated deployment of components and systems management via appropriate systems and languages (e.g. SmartFrog, CIM, Ant). Such technology allows instrumentation and data gathering to be performed in a systematic and uniform manner across the system, thereby facilitating control and management compared to traditional IT systems.

Practical concerns arise for utility providers and their business customers alike. Utility Providers are concerned that their systems are being as fully utilised as possible and they getting as much chargeable service from their equipment as possible. On the other hand, Service Providers and Customers are concerned that they are getting the services that they are being charged for according to contract, that their IP is being kept confidential and that the appropriate computational services are well-managed. How these apply in practice can be seen from the following exemplary questions.

1. Provider Asks: What Happens to My Utility Systems If this Worm Attacks Us?

Consider the following scenario: a Utility Provider is operating a large set of networked systems in a data centre with resources fully allocated to a number of their business customers. The Utility Provider learns that there are various kinds of worm attacks (e.g. Sasser) are underway. Although patches will shortly be available, there will be some time during which customers could be exposed:

Some questions are:

What is the likely effect/impact of an outbreak within the data centre?

In what order should my servers be patched to reduce the impact of these attacks for my business customers?

Given best-effort defense, we should accept that some systems will still be vulnerable—at least until the official patches can be applied. In that case, on what basis can I produce a reasonable estimate of the legitimate computing and network activity that I should charge my unpatched customers for? What is the trade off to be made here?

Does this attack compromise customer data separation? If so, what could be done about it?

2. Customer Asks: How is My Confidential Data Protected?

Consider the following scenario: a corporate business customer outsources an important part of their IT operations to a Utility Provider, subject to an appropriate Service-Level Agreement and contract. However, to run the service effectively, the customer will need to provide direct access to significant IP such as confidential commercial data. Such information could certainly be useful to a competitor.

Some questions are:

What is the risk of exposure of my valued IP?

Can I organise my resources and their defenses better to mitigate my risks of data exposure, whilst still continuing to operate effectively?

Can any other customer see my data on my VLAN? Can I access anyone else's VLAN? If I could see them, perhaps they could see me?

How well are my services performing under this Utility Provider?

The present inventors have appreciated that constructing some kind of model of the utility system that is accessible to customer and provider alike allows for practical answers to many of these questions. The goal is then to represent the security aspects of a deployed utility, in a form permitting exploration of interesting and relevant "what-if" consequences.

An important part of the value proposition for Utility Computing is that the utility systems architectures can be built up from standardised, commodity third-party components for the networking, the server hardware and the software stack. This means that the overall system offers a uniform, standardised computing environment to each of its customers that is not dependent in detail upon which particular resources are allocated to particular customers. This has the benefit from the Utility Providers point of view that hardware and software systems can be more readily replaced and swapped around in the event of component or systems failure.

This has a further implication for the kind of security modelling that can be effectively used in practice. Because third-party components are used, this effectively restricts the type of information, properties and characteristics that the model has available about any particular component system or device. Practically, the security model has to be based upon the infrastructure's configuration information as much as possible.

Modelling the utility in an effective manner could be attempted at many different levels. For example, each of the networking devices, the compute servers and even the software itself can be thought of in terms of detailed systems activities and processes. However, as explained above, the utility is built out of standardised, third-party components for which it is unreasonable to expect there to be sufficiently detailed, readily available descriptions of behaviour. Accordingly, we have to instead make good use of whatever information about these components that is available, such as the systems configuration information, for instance. Fortunately, this is likely to be readily associable with security characteristics. However good the description available, it is considered that some form of abstraction would need to be applied in any case, if one wants to be able to gain any kind of effective prediction concerning the security of utility configurations.

The kind of models we are interested in here involves viewing the utility architecture as a kind of graph structure which can be extracted from information such as configuration information. This structure also conveniently permits us to perform various reachability path queries, allowing us to examine the security consequences of modelled utility configurations (e.g. impact analysis).

The general approach to modelling can be described as follows. As indicated above, various kinds of lightweight logical model of the deployed utility-style IT systems, derived from these systems description, will be required to obtain the necessary degree of automation to manage utility systems at a sufficient scale to be economically viable. Given a suitably rich semantic network knowledge representation of a utility system, we can use reachable path queries against this model (or ones derived from it) to determine which security critical components (if any) occur upon these access paths. The security-critical components currently correspond to defined access control agents and mechanisms (hardware and software) such as OS file privileges, messaging protocols, database access controls, firewalls, etc. The basic idea is that these entities represent logical control points through which access is controlled. We can, for instance, consider what characteristics these components need to have so as to achieve particular security requirements for the system as a whole. In particular, this may comprise protecting the assets and resources of interest, whilst also permitting access for defined business purposes.

Some Definitions for model elements:

1. object—fundamental entity within the model, characterized by named attributes that refer to primitive values (e.g. numbers, strings) or other objects. Each object belongs to a class (i.e. classes represent collections of objects and the methods over them). An object is said to be an instance of some class.

Examples: nodes, links, associations.

2. Association—an object representing network linkage or logical dependency between objects comprising the following information:

From object:

To object:

Attributes (as for a standard node object—see below).

Associations can be objects having class hierarchies of their own. Furthermore they can be either one-way (i.e. directed from-to-) or two-way (i.e. tying together).

EXAMPLES

1. Communication paths between objects (e.g. Communications networks and protocols)
2. Usage of objects by another object. (e.g. Usage of hardware components between systems units, Software class hierarchies and other knowledge-based ontologies, Systems/software library use relationships (API's, shared libraries e.g. DLL's, .so's))

3. General logical dependency between objects (e.g. Functional/object decompositions into sub-systems and sub-processes, corporate data base schemas, metadata and meta modelling information)

3. node—a primitive object representing a specific thing of interest that may appear the model. Examples of entities which can be represented by Nodes include:

Devices/Infrastructure components: Micro-Processors, Printers, Scanners, Display Units/Multimedia systems, Memory, Network connectors/cards (for e.g. Ethernet, USB, Firewire and so on,), Storage Media such as Tapes, Disks, Storage Arrays, Routers, Switches, Hardware Firewalls, Hardware processing accelerators (such as Crypto processors, Graphics rendering accelerators, Graphics cards and so on)

Computing Systems: such as Handhelds (e.g. Personal Data Assistant), Laptops, PCs, Thick Client (e.g. PC with substantial processing power), Thin Client (e.g. terminal access/networked graphical display), Server, Server Cluster, Data Center Computing Farm, and so on Software entities: Operating systems, Operating Systems services, File systems, Logon, Account mgmt, MS Windows, Windows Server 2003, Windows XP, Windows NT 4.0, Windows 2000, Unix, Linux, HP-UX, Solaris and so on, applications such as: System management apps, Team/project management apps, Software development applications, (Compilers, Debuggers, Configuration management, Version control, Integrated Development Environments and so on), Office user applications (Document Editors, Data base applications, Spreadsheets, Slide preparation applications and so on), Systems control automation systems, Manufacturing Process control systems and so on.

Services:
  Security Services (Intrusion/Detection systems, Anti-Virus systems, Firewalls including Network based systems, Host based systems,
  Communications Network services
    TCP/IP Administration Services such as VoIP (Voice over Internet Protocol) services, VPN (Virtual Private Network) services, VLAN (Virtual Local Area Network) services and WAN (Wide Area Network) services.
    LDAP (Lightweight Directory Access Protocol) Services
    DNS (Domain Name Service)
    ARP (Address Resolution Protocol) Services
    DHCP (Dynamic Host Configuration Protocol) Services
    SNMP (Simple Network Management Protocol) Services
    SAN (Storage Area Network) services
    and so on . . .
  Application-level Services
    Single-sign on identity management services (Identrus, MS Passport, Liberty alliance and so on)
    Data Base services (e.g. Oracle 10 g, MS SQLServer, MySQL Enterprise Server and so on)
    Web Servers (e.g. Apache v1.3, MS IIS server and so on)
    General Application-server systems (e.g. WebLogic, BEA Systems and so on)
  Business-level Services such as Enterprise Customer defined services, Customer Services account management, Web order processing system, Financial Account management portal/applications, Supply chain operations portal/applications, Data warehouse management service portal/application, and Computer aided manufacture control applications and so on.

A specific approach to model creation according to this philosophy is now described. We will represent particular entities such as hardware servers by objects having a certain attribute structure that is specified by a class structure. For example:

```
def_class(server, [device, computer]
  [ location          / string,
    role              / string,
    model             / string,
    os                / OS ])
``` specifies a class called server that is a sub-class of both device and computer with several simple attributes such as location (of type string) and operating system (os of type os).

The systems entities that we are attempting to capture and describe are naturally multi-faceted and so we provide a class system that also supports multiple inheritance. We have also found it useful to be tolerant of partial and incomplete information. In particular, we do not require that attributes are always defined for every instance of a given class. However, once the attribute value is defined, then we expect it to match the associated type constraint.

Note that supporting multiple inheritance of classes means that the ancestor classes of some class must have attributes that are mutually consistent in terms of their types.

Values are defined in terms of the particular classes they instantiate and the attributes that they are given. For example:

```
defn (my_server,
  server(role                / "My server",
    os                       / rh_linux,
    remote_admin_access      / false,
    tty                      / p27,
    location                 / "main m/c room"
  )
)
``` defines a particular instance of the class server, called my_server. Note how this instance doesn't possess the attribute model mentioned in the class definition for class server. Additionally, the instance also included a couple of extra attributes (i.e. remote_admin_access and tty).

We may add, delete or modify attribute information at some later to reflect our current state of knowledge. In modelling "live" systems, we are inherently dealing with incomplete and imperfect information that are continually subject to change and revision. Nothing about the configuration of the utility is assumed to be known with complete finality.

In fact, we may define instances and classes in any order—class definitions can follow after instance definitions if necessary. This implies that instances may need to be (re)validated upon class (re)definition.

In principle, classes may also have logical invariants associated with them. However, these are only applied and checked upon update of the relevant attributes for each instance. This is because invariants are only meaningful and checkable if all the relevant attributes are defined. This gives a more permissive regime accommodating our understanding that knowledge about the utility configuration is typically incomplete.

We need more than pure objects to express all the characteristics that we are interested in. In particular, we are interested in various graph-theoretical concepts of linkage and connection that naturally arise when modelling systems (e.g. network connectivity between devices, module and library use relationships). To this end, we introduce a structured form of binary association (or link). These are structured entities that explicit join or connect two objects (the source and target). We allow associations to be either directed or undirected.

Associations are structured in the same ways that objects are in the sense that they have a class structure (called link-classes) and also may have attributes of their own. Thus, we distinguish between attributes and associations—which are often treated in the same way in other modelling systems. This means we can easily formulate properties qualifying not only objects but also the associations themselves.

A consequence of using link-classes to qualify associations means that we can constrain the kinds of object that can be used as sources and targets. For example, we make use of this to ensure that associations representing network connectivity can only be attached to computer systems and not other kinds of entity, such as some kind of software component. Furthermore, by using attributes on the links themselves, we can assert that an association represents a communications path between two systems using particular protocols e.g. https, tcp-ip. Another application of using attributes on associations is in modelling VLAN links.

Figure 2:
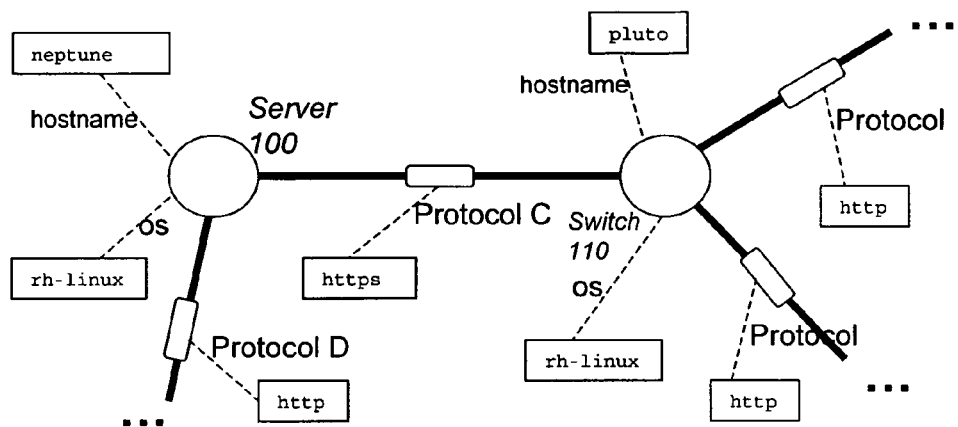

The use of attributes on both objects and associations is illustrated in FIG. 2. This shows an example of a model of part of a network. Two nodes are shown, a server 100 and a switch 110, represented by objects. Each has attributes shown by dotted lines. The server has operating system OS=rh-linux, and hostname=Neptune, and others not illustrated. The switch has hostname=Pluto and OS=rh-linux for example. Four links are shown coupling the nodes, each representing communication links having attributes represented by the dotted lines. The switch is coupled to other nodes not shown, by links having protocol=http, and is coupled to the server by a link having protocol=https. The server is shown coupled to another node, not shown, by a link having protocol=http. Application services can be represented in corresponding ways, as nodes and links having attributes.

As we have described, the utility architecture is modelled in terms of attributed objects linked together by structured, attributed associations. This means that the kinds of connection between objects are not just simple links but can be quite complex in their own right.

There are two kinds of queries that will be used:
Node queries that select particular sets of nodes.
Path queries that show that two sets of nodes are linked together by paths satisfying certain constraints. This kind of query naturally involves reachability over the graph of associations.

As a result of this expressiveness of linkage, we can impose semantic constraints on the routing connectivity between different classes of nodes, for example. This allows particular classes of node, such as firewalls and switches, to have some specific connectivity properties that can be dependant upon:
Attribute information associated within the particular node.
Attributes within the incident associations themselves.
Other specific path information (e.g. overall source and destination).

Figure 3:
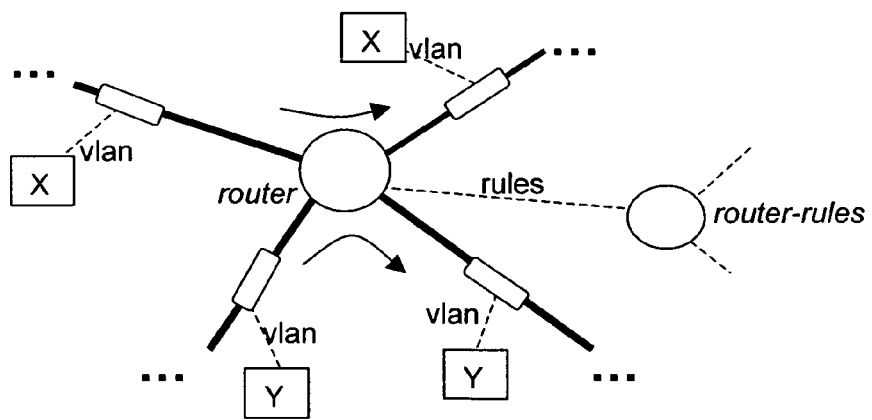

These special connectivity properties are defined by connection predicates for particular classes and link-classes. For example, each router instance will typically have a "rules" attribute whose value could define the permitted VLAN connections. The linkages permitted via the router instance then depend upon these rules and the attributes of the respective associations and their link-classes. This dependency will be determined by a connection predicate defined for the class of routers. This is shown in FIG. 3 which includes a node object representing a router and four link objects. The arrows show the connectivity of the router as configured currently. The links having attributes VLAN=X are coupled together by the router. Also, the links having attributes VLAN=Y are coupled together by the router. As shown, in this example, the connectivity is one directional.

Routing and path formation can in general depend upon more than the local attributes of the association's incident to the node. For example, routing through a firewall will typically depend upon the source and destination IP addresses of a path. Generally, the concept of link or association will include the concept of logical dependency. Basically, links can represent:—
Communication paths between objects (e.g. Communications networks and protocols)
Usage of an object by another object. (e.g. Usage of hardware components between systems units, Software class hierarchies and other knowledge-based ontologies, Systems/software library use relationships (API's, shared libraries e.g. DLL's, .so's))
More widely, general logical dependency between objects (e.g. Functional/object decompositions into sub-systems and sub-processes, corporate data base schemas, metadata and meta modelling information)

FIG. 4 shows another example of part of a model. This is notable for showing a composite structure of nodes representing different layers of the actual network, including devices, operating system and applications. This helps enable information such as effects of the higher layers on other paths, to be represented more efficiently. So if security properties of the applications depend on the operating system, this can be represented simply by adding links in the model, and adding attributes to the objects shown. Hence the potential or actual configuration of software such as operating systems and applications, and whether they pose any risk to connectivity or isolation of business critical paths, can be modelled, and so better assurance of the network can be provided. This is an example of an indication of criticality of a node or link to a given one or more of the application services.

FIG. 4 shows four nodes, including an object representing a server, and object representing an instance of an operating system called Enterprise Linux, an object representing an application in the form of an oracle 10 g database, and an object representing an application in the form of a web server called Apache v1.3. Of course in a real network there may be many more such nodes. The links shown by solid lines include links between the operating system and the applications, each link represented as an object having attributes. Other links include links from the server representing communication links to other parts of the network. One link shows a protocol attribute of type https, as an example. Optionally a separate object can be used to represent the physical processor on which an instance of the server is running.

The server has various attributes including a hostname, in this case Saturn, a type of operating system, in this case rh-linux, and an IP address, for example 15.144.57.211. Another attribute of the server is that it is running an instance of the operating system called enterprise linux.

As illustrated, the enterprise linux instance has attributes such as type=rh-linux, mode=protected, version=3 for example. The applications may have a number of corresponding attributes (not illustrated in detail). The link object to the oracle database may have attributes such as service type=database, and app-type=managed. In the case of the link object to the web server, this may have attributes such as service type=web-server, and app-type=managed.

Utility designers, providers and operators may be interested in knowing any of the following:

Is it possible for the configuration of this part of the utility to have a certain kind of impact on this other part of the utility?

Given that some part of the utility has a given property, what is the likely impact this has elsewhere on the utility?

Given that a certain particular situation has arisen, what utility configurations could have allowed this to happen?

The kind of reasoning about the utility needed to answer all of the above critically depends upon being able to explore the model and find paths having certain characteristics that link certain sets of nodes. Paths are represented as (non-repeating) sequences of links, where the nodes and links satisfy certain properties. In simple cases, such path-finding typically involves computing reachability in terms of transitive closure of the graph. In practice for a complex system, it is desirable to adopt a strategy that tries to minimise the number of unnecessary paths or linkages computed.

Some examples of application of a query evaluation framework developed on this basis are given below.

ask (servers)

This query determines the current set of all servers—and may be used in an appropriate system to display them all.

ask (servers and [os/rh_linux, version/9.7])

This query determines the set of servers with attribute os set to "rh_linux" and attribute version set to 9.7.

ask (server and reaches (file_server, network and [protocol/https]))

This query determines those servers that can reach/access those file_servers via edges of link-class network having attribute protocol set to https.

reach (n1, n2)

This query determines an enumeration of the set of paths from a node labelled n1 to node labelled n2 (where there is an additional semantic constraint built-in). Typically, there may be several paths satisfying the semantic constraint but usually only the first is of interest as a witness of existence.

| | |
|---|---|
| • ask_multi_path( customer_sys, | |
|     [ [ svc_portal, | network_http] |
|     , [ server and contains(render_app), | network_http] |
|     , [ vuln_utility_servers, | network_http] )) |

This query determines an enumeration of composite paths starting from nodes belonging to customer_sys and which use links belonging to network_http to reach several intermediate node sets (e.g. svc_portal) and which finally reaches the set vuln_utility_servers.

Future extensions include defining and implementing a query and data description language based upon the framework developed so far. Traditional database oriented knowledge representation, based upon non-recursive relational algebra (as typified by SQL) doesn't adequately cope with the richer path-type queries, such as reachability and transitive closure. Thus, our query language has to strictly extend the range of queries that are typically supported by a conventional relational database.

By adding a form of recursive query, we provide a strictly more expressive query language than provided by any variant of SQL, the Standard Query Language. This result has been previously exploited in the different field of AI-style reasoning applications. In practice, such queries would have to be executed using ad-hoc "stored routines/procedures" that are external to the database system itself.

A difficulty for model driven approaches to systems architecture is that high-level models can very quickly lose touch with the actual system after implementation and deployment. Typically, models aren't kept up-to-date and do not provide an accurate reflection of the system dynamically. This is a potential problem for the approach described above, as it solely discusses representations and techniques for reasoning about models of systems infrastructure, and merely assumes that there is some accurate correspondence to the current configuration.

However, there already exist mature, well-developed tools and standards for reporting systems configurations (e.g. HP OpenView and SNMP). More recently, some promising standards and technologies (e.g. CIM, UML and SmartFrog) are emerging that could help provide the semantically rich device and infrastructure descriptions that are required. CIM, Common Information Model, is standardised by the Distributed Management Task Force DMTF (see [http://www.dmtf.org, http://www.dmtf org/standards/cim/]). Broadly, this means that we can define a collection of plug-ins that allow systems infrastructure descriptions to be supplied in a variety of formats and then used to build models for subsequent processing and analysis (shown in FIG. 5). This figure shows in schematic form how a number of system descriptions in different formats relating to devices or services for use in the network can be gathered automatically to create and add to the model of the network infrastructure, to make representations of alterations to the network infrastructure. The modelling tools receive the descriptions in any of SNMP, CIM and smartfrog and other formats.

Smartfrog is an example of a way of extracting systems infrastructure configuration descriptions, and can be described as an automated distributed deployment technology, such as SmartFrog (see [http://www.smartfrog.org/ http://www.smartfrog.orgpapers/sfReference.pdf]). This is a technology for describing distributed systems as networks of cooperating software components, for the purpose of initiating them and subsequently managing their activity.

Systems deployed using SmartFrog typically have multiple software components running across a network of computing resources, where the components must work together to deliver the functionality of the system as a whole. It is critical that the right components are running on the correct computers, that the components are correctly configured, and that they are correctly combined together into the complete system. This requirement recurs across many services and applications that run on all kinds of computing infrastructure.

A concrete example might be a three-tier web application, which will often consist of a database server, application logic middleware, web server software, firewalls and load-balancers. All of these can be thought of as components that need to work together to deliver the complete web-service. Each component must be installed on an appropriate resource and correctly configured. Components must be started in a certain sequence, and linked together into the complete system.

Two exemplary prototypes will now be described.

Enterprise Security Modelling Tool

This tool developed the object-oriented deductive database approach, in which:

Models of utility computing infrastructure can be constructed in the manner described above.

Certain kinds of graph reachability query can be run against the model and the results obtained were shown to combine together to help investigate high level accessibility questions, as motivated by the two scenarios mentioned earlier.

Figures 6, 7:
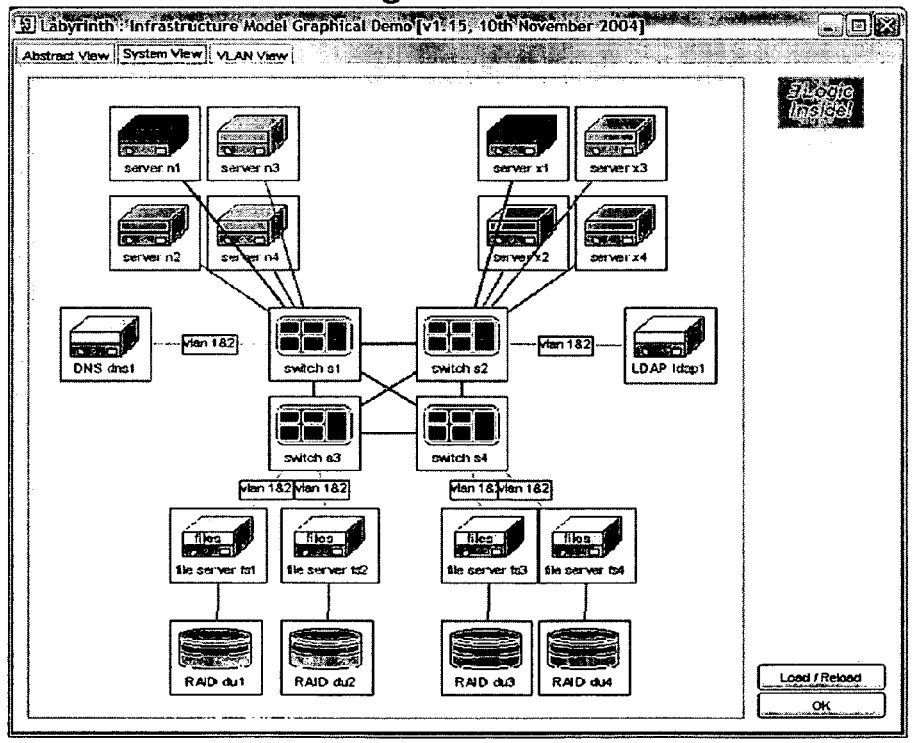
FIGS. 6 and 7 show screen views of a security modelling tool according to an embodiment.

This used text based data entry and shows that an effective model can be constructed and then queried in a manner useful to utility customers and providers. A screenshot is shown in FIG. 6. This shows part of a process of adding links and their attributes to the model, by manual text entry, followed by a summary of the objects in the model, their classes, and the number of node objects and link objects. This is an example of making a representation in the model of alterations in the network infrastructure.

Labyrinth

Labyrinth was another embodiment developed with a more accessible graphical user interface to simplify the interaction with the modelling tools. This was implemented by running a graphics display application (written in Java) concurrently with the reasoning database engine. The strategy taken was to focus on how graphical information could be extracted for presentation from systems models and how to illustrate the results of queries. A screenshot is shown in FIG. 7 and implementation architecture in FIG. 8. FIG. 7 shows a view of a network having two clusters of servers n1-n4 and servers x1-x4, and two clusters of file servers fs1-fs4 and RAID du1-RAID du4. A 2×2 array of switches s1-s4 are coupled together and coupled one to each of the clusters. A DNS server dns1 is also coupled to switch s1, and an LDAP server ldap1 is coupled to switch s2. The graphical view enables critical paths to be highlighted by thicker or different coloured lines for example. If the model is queried to find out reachability of a given part of the network, the results can be shown by highlighting graphically the critical paths or critical elements required for isolation for example. Conditional paths can also be represented. Similarly, if a network change is proposed, then the resulting changes in reachability can be highlighted.

The sort of query that can be made, and answered by visual display, with this arrangement can be illustrated by the following examples of determining security properties:

Are servers A and B on the same VLAN? This may be shown by the path between them, indicating that switching lies between them.

What switches are involved in connecting A and B, and by what paths? Any different paths may now be illustrated, showing all switches involved What other Systems Services could affect this? A path to a relevant system entity—such as a shared DNS server—can be shown.

The logical model used can be derived from an accurate and up-to-date deployment description of a well-instrumented utility-style IT system. This helps ensure that security consequences derived via the model have relevance to the corresponding live system that is currently deployed.

The representation is lightweight in that the functional and behavioural characteristics of devices and systems are not captured in anything but the barest of details—instead, we focus upon object attributes that adequately represent configuration information for each device or system. This yields a number of benefits:

The lightweight representation allows us to incorporate $3^{rd}$ party systems and devices solely in terms of object attribute-style information (e.g. configuration data). This neatly avoids needing deep characterizations of behavioural or functional descriptions.

It allows focus upon those characteristics having direct relevance to overall systems and device management.

It enables efficient analysis based upon graph-theoretic reachability queries.

Figure 8:
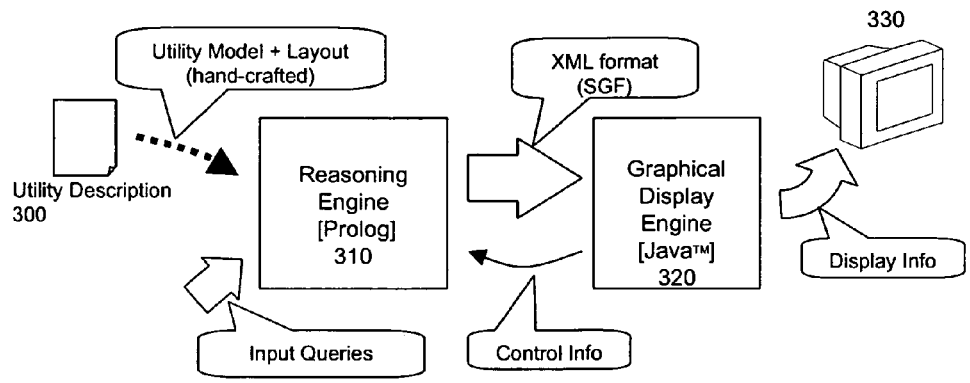
FIG. 8 shows a schematic view of an architecture for a security modelling tool according to an embodiment.

The compact and lightweight semantic network representation permits cost-effective reasoning capability that offers rapid exploration and experimentation via path and node queries. This helps security professionals and operations executives understand and gain insight into the security consequences of configuration changes to their system, in terms of the model. Using a logical model at this point (rather than the real utility system itself) decouples the risk of performing experimental changes on a live system, which could be potentially highly disruptive or even disastrous. As shown in FIG. 8, a model 300 of the network (here in the form of a utility description, including descriptions of nodes and links, perhaps part built by hand, part built automatically), is used by a reasoning engine 310 using a conventional language such as prolog. Queries are input to the engine, either framed by hand, or with automated assistance, for example to check periodically for assurance of business critical connectivity or isolation. Outputs of the reasoning engine may be examples of security properties, or changes in security properties, in a XML format and a graphical display engine 320 using Java for example, is optionally arranged to display the output as discussed above on display device 330. Control info can be fed back from the graphical display engine to the reasoning engine. This enables synchronising updates and passing back input gestures from mouse and keyboard and so on.

Other uses for the output of the reasoning engine include further processing for prioritizing or proposing network maintenance work or reconfiguration for optimisation, for example. Further extension to this approach may be made by considering further sources of risk. Supplying effective security involves knowing what needs to be defended, whilst at the same time enabling business utility customers to serve their end-customers, to continuously optimise operations, and maintain their competitive edge.

This involves not only some understanding of the configuration of the infrastructure systems but additionally some understanding of the needs that they are designed to serve. This involves to some extent understanding and mapping out the organizational context and the business processes involved. Such knowledge helps both the business customer and their utility providers to see better what the risks are and thus making informed decisions concerning how best to defend their assets with the resources available.

Such risk management involves a risk assessment—risk assessment has meant calculating "impact×probability" in some meaningful way. Such a calculation is difficult to do meaningfully unless the impacts of compromise and loss of service functionality have been understood in business terms.

A key part of this risk assessment process involves the business determining its "risk appetite". This is a risk profile that identifies classes of risk and at what level risk is deemed acceptable and, consequently, what level it is deemed unacceptable. Once risk has been identified and assessed, appropriate controls and process mechanism can then be put in place to mitigate the overall risk by reducing the probability of incidents and even their impact. Of course, these controls themselves will have some management overhead and a need for appropriate configuration.

From a business point of view, security issues are also increasingly linked with corporate IT governance. Legislation such as the HIPAA and Sarbanes-Oxley acts in the US now make corporate management directly accountable for their organizational practices, including financial integrity and security. The need for regulatory compliance is now forcing companies on a global scale to develop and adopt explicit security policies and mechanisms. Also, at a systems level, there is increasingly a parallel to be seen between policy and management for security in business-critical systems and policy and management for safety-critical systems. Approaches for actively managing risk associated with safety concerns may therefore be relevant in the context of security.

It is also necessary to consider stewardship issues that naturally arise in the context of Utility Computing, where customers place their IT capital in the hands of one or more trusted Utility Providers. Today, commercial organizations view the Internet as primarily a business tool via which business transactions are routinely performed. The Internet is also a source of potential threats, which therefore has to be balanced against modern business needs. The risk analysis models need to incorporate strong identity concepts (e.g. AAA, VPN) to appropriately assign responsibility and capabilities. Finally, there is a clear need to explicitly identify systems management roles and associated controls as a part of the infrastructure mapping—and this certainly lies at the interface between systems and business organization.

Figure 9:
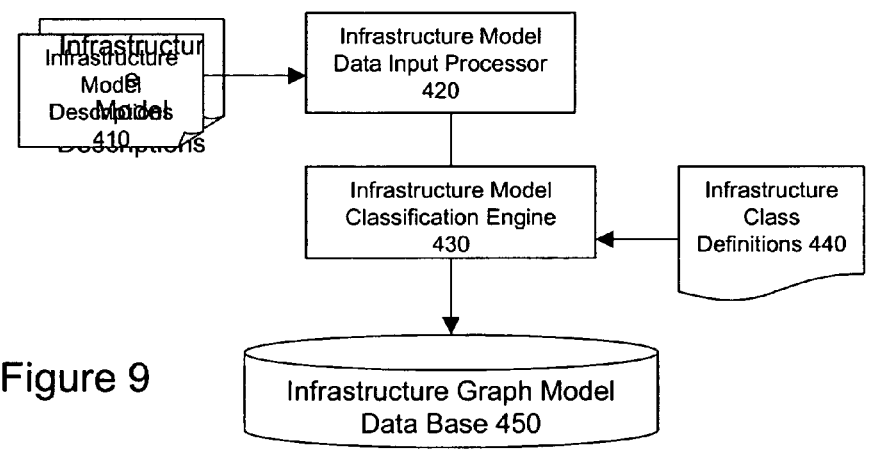
FIG. 9 shows a schematic view of a process for capturing Infrastructure descriptions and internalizing them into the data base, according to an embodiment

FIG. 9 shows a schematic view of a process for capturing Infrastructure descriptions and internalizing them into the data base. This is an example of making a representation in the model of alterations to the network infrastructure. A representation 410 of a new part of the infrastructure is provided to the Infrastructure Model Data Input Processor 420. In the current prototypes, this information is given in the form of a textual document (i.e. in the Prolog programming language). However, reasonable refinements include using an XML/UML document structure provided from a variety of different sources.

The Infrastructure Model Data Input Processor normalizes the input data format and passes the intermediate results to the Infrastructure Model Classification Engine 430. This system uses the Infrastructure Class Definitions 440 to classify the intermediate information and fill-in missing information with defaults. This "filling-in" process uses pattern-matching to determine the defaults to be added. Implicit association links and relationships can naturally be established here. This result of this process is a graph description sufficiently complete for making path queries over. The resulting graph is then retained/stored in the Infrastructure Graph Model Database 450, ready for access in solving path queries.

Figure 10:
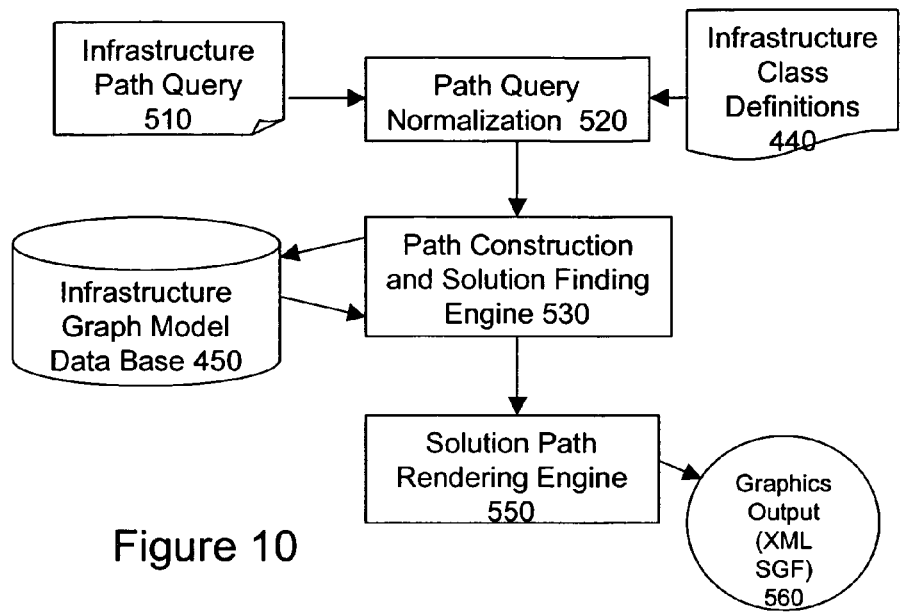
FIG. 10 shows a view of an overall process for compiling and solving path queries according to an embodiment.

FIG. 10 shows a view of an overall process for compiling and solving path queries. Any solutions found are to be displayed graphically in this example. Infrastructure Path Queries 510 are formulated as structured textual objects from a text file description or potentially via some Graphical User Interface. These are passed to the Path Query Normalization processor 520 which consolidates this information with the Infrastructure Class Definitions 440. In particular, conflicts due to mismatches with infrastructure class properties can be detected here.

The consolidated information is passed to the Path Construction and Solution Finding Engine 530. This takes the path query and then interrogates the Infrastructure Graph Model Data Base 450 in an attempt to find matching linkage elements. The engine then iteratively puts these elements together into candidate paths, to try and find any paths which satisfy the overall path query. An important part of this is efficiently exploiting the attributes on both the graph's nodes and links in order to find the currently most relevant nodes and links. In our prototypes, standard relational logic programming techniques were exploited to do all this. A possible refinement for higher level performance could be to develop a more special-purpose graph searching engine that exploits leading edge graph theoretic algorithms encoded at a more fundamental level (i.e. exploiting machine representations). For the time being, we exploit the attributes and also that clustering and grouping of graph elements to help avoid the inevitable combinatorial explosion when searching for constrained path solutions.

Any path solutions found are passed to the Solution Path Rendering Engine 550 where this information is rendered into a suitable graphical format 560 ready for display by the external graphics display components.

Figure 11:
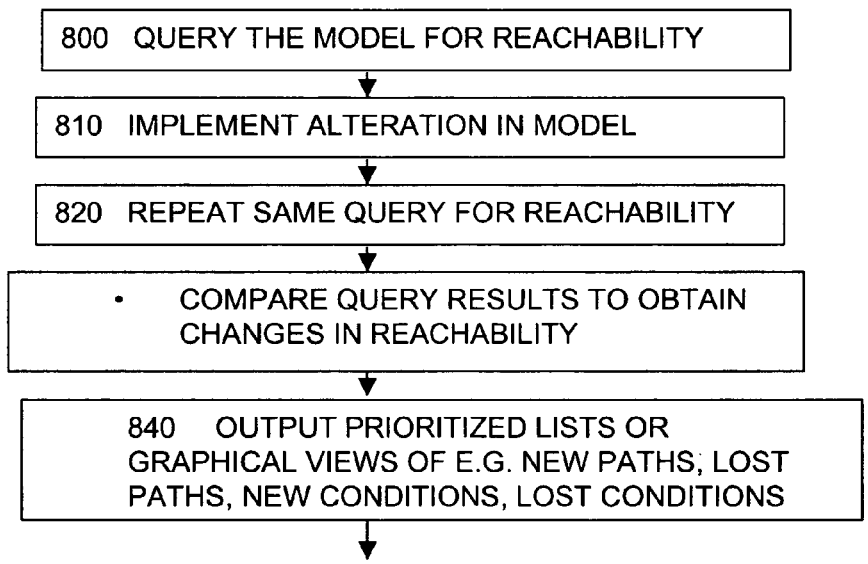
FIGS. 11 and 12 shows steps in determining a change of reachability according to another embodiment.

FIG. 11 shows an example of how to determine changes in security properties such as reachability, using the embodiments discussed above. Reachability is an example of dependencies or effects. At step 800, the model is queried to determine reachability of a given part of the network. At step 810, an alteration in the network infrastructure or application services is carried out in the model, and the same reachability query is repeated at step 820. The results before and after the change are compared at step 830 to obtain changes in reachability. These changes can be processed in various ways, one example is to display them graphically or in list form, with some form of prioritization according to business importance if there are many (step 840).

Figure 12:
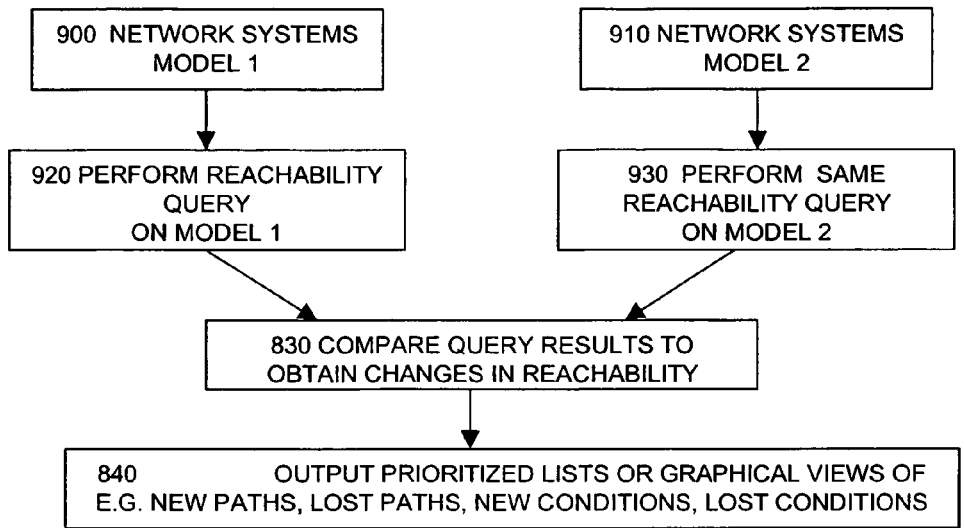

An alternative, shown in FIG. 12 is to provide another copy of the model, (900, 910) implement the alteration on the copy 910, then put the same query to both models simultaneously (920, 930). As before, the results with and without the alteration are compared at step 830 to obtain changes in reachability. These changes can be processed in various ways, such as (840) producing an output of prioritized lists or graphical views of e.g. new paths, lost paths, new conditions or lost conditions.

Figure 13:
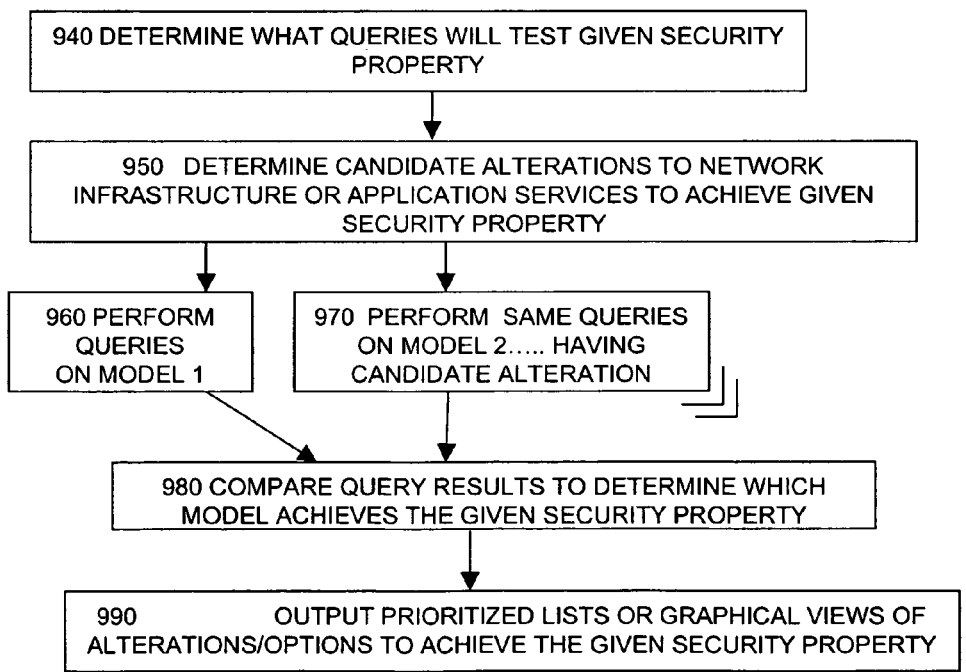
FIG. 13 shows steps in assessing alterations in network infrastructure or application services, to achieve a given security property.

FIG. 13 shows an example of a process in which the model is used in a "reverse" direction, to obtain information to guide the reconfiguration of the network infrastructure or application services, to achieve a given security property. This can either be an alternative to or a supplement to the process of FIGS. 11 and 12, or other embodiments. The processes can be repeated to optimise different security properties for example. At step 940 it is determined what queries will test the given security property. At step 950, candidate alterations in the network infrastructure or application services are determined. At step 960, the queries are performed on model 1. At step 970, the same queries are performed on model 2 having a first candidate alteration. Further models can have further candidate alterations, and be subject to the same queries. At step 980 the results are compared to determine which alteration or alterations, if any, contributes to achieving the given security property. At step 990, the results can be used in various ways including automated reconfiguration of the actual network, or providing recommendations to a human user, for example in the form of suggested actions, or prioritized lists or graphical views of alterations or options to achieve the given security property. There may be a continuous series of ongoing alterations such as server or software updates, patches and increases in capacity which need to be monitored for cumulative security consequences. The process of FIG. 13 can be used to monitor such alterations and suggest alternatives if necessary. This means it can be used to maintain and enforce security policies in networks.

As has been described above, distributed IT Systems are composed of composite, structured devices (consisting of combined Hardware and Software) that are linked together via various kinds of graph or network, such as:

Communications networks and protocols.

Hardware interconnections between systems units.

Software class hierarchies and other knowledge-based ontologies.

Functional/object decompositions into sub-systems and sub-processes.

Library use relationships (API's, DLL's, so's (shared libraries)) . . . etc.

(Note: we will mostly use "network"-style examples because of their familiarity to the technical community—our ideas apply equally to hardware, networking and software systems).

Experimenting with the core analysis and semantic modelling has led to embodiments described above which implement a form of relational/object-oriented database with some more sophisticated querying/"reasoning" capability. Such a system can also be equated to modelchecking over a pure graph with information in both nodes and edges (Modelchecking by Clarke, Grumberg and Peled, 1999). Note that the graph relation we deal with is not restricted to state transition systems etc. In the labyrinth embodiment, visualization of the graphs and the result of queries was implemented by running a graphics display application (written in Java for example) concurrently with the reasoning database engine.

A canonical input format for system descriptions can exploit existing systems description formats such as CIM, SmartFrog and UML. The UML (Unified Modelling Language) is a rich graphical modelling notation that is standardised by the OMG (Object Management Group)—http://www.uml.org. It incorporates means to describe classes (e.g. class diagrams) and entity-relationship structures, as well as use cases, message sequencing, event sequencing and collaborations. UML also allows for structured association links and classes in a similar way to the way that CIM does so. For ease and speed of development, prototypes were originally developed in a combination of Prolog and Java. However, this combination is not essential and the embodiments could use any modern programming or scripting language providing modern run-time support and modular, structured data typing, such as C#, Java, Standard ML, Python, Ruby, etc.

A notable feature described above is generic knowledge representation—object modelling: Nodes form a kind of typed entity and are characterised in terms of named attribute entries. Links (also called Edges) represent significant associations between pairs of entities, and also have attributes in the same way as nodes do. Accordingly, in this framework, edges are not the same as "simple attributes" in the way they usually are in conventional class and object modelling.

Each node or edge entity can be an instance of an appropriate class and we allow multiple inheritance of classes. Classes are also entities—of class Class. We also use connection predicates to characterise flow patterns which qualify the semantics of connections that is used in making reachability queries. For example, this allows us to define switch-like behaviour in terms of VLAN attributes on edges incident to nodes of class "switch". This can be built-in or a suitable interface for adding userdefined connection predicates can be used. Note that our reachability queries strictly extends the kind of queries that can typically be made by a relational database. By adding this form of recursive query, we have a strictly more expressive query language than any variant of SQL, the Standard Query Language. Although known since the 80's (Ullman, Principles of Data Base Systems), in the context of in AI reasoning style applications, it has not been exploited until now for network assurance or reachability.

Some examples of queries include the following:

Paths are represented as (non-repeating) sequences of edges, where the nodes and edges satisfy certain properties. It is possible to bind the results of queries to identifiers denoting sets of nodes, edges or even paths. We informally illustrate the kind of queries available by a small number of examples:

1. find (servers). This query graphically displays the current set of all servers.
2. find (servers and [os/linux, version/9.7]). This query displays the set of servers with attribute "os" set to "linux" and "version" set to 9.7.
3. find (server and reaches (file server, network and [protocol/https])) This query displays servers that can reach/access file_servers via edges of type network and all having protocol attribute is https.
4. reach (n1, n2). This query successively displays the various paths from node labelled n1 to node labelled n2 and highlights those components along the routes that satisfy certain VLAN properties.

Other variations include extending this query language, and the use of visual display metaphors etc, as appropriate.

The logical model can (in principle) be derived from an accurate and up-to-date deployment description of a well-instrumented utility-style IT system. This helps ensure that security consequences derived via the model have relevance to the corresponding live system that is currently deployed. The representation is lightweight in that the functional and behavioural characteristics of devices and systems need not be captured in anything but the barest of details—instead, we focus upon object attributes that adequately represent configuration information for each device or system. This yields a number of benefits:

The lightweight representation allows us to incorporate 3rd party systems and devices solely in terms of object attribute-style information (e.g. configuration data). This neatly avoids needing deep characterizations of behavioural or functional descriptions (c.f. avoiding traditional formal methods). It allows us to focus upon those characteristics having direct relevance to overall systems and device management. It enables efficient analysis based upon graph-theoretic reachability queries.

The compact and lightweight semantic network representation permits cost-effective reasoning capability that offers rapid exploration and experimentation via path and node queries. This helps security professionals and operations executives understand and gain insight into the security consequences of configuration changes to their system, in terms of the model. Using a logical model at this point (rather than the real utility system itself) decouples the risk of performing experimental changes on a live system, which could be potentially highly disruptive or even disastrous.

Other applications: Beyond communications networks, by analogy the embodiments can be applied to the needs of management to explore consequences of change in industrial utility—style applications such as Oil and gas pipeline management, Oil and chemical refinery plant management, Power stations (esp. nuclear and gas) management, Electricity transmission grid management Food distribution management (by supermarket retail chains), Retail distribution management in general, and in supply chain management in general.

Implementation:

The applications can include any type of software including CAD, database, web page server, and other types. Virtual machines for servers and so on can be implemented using any conventional programming language, including languages such as C, and compiled following established practice. The software can run on conventional hardware with conventional processors.

As has been described above, a method of assessing a network uses a model (450) having nodes to represent parts of the network infrastructure and the application services, and having links to represent how the nodes influence each other. Dependencies or effects of the application services are found by determining paths through the nodes and links of the model (530). Such assessment can be useful for design, test, operations, and diagnosis, and for assessment of which parts of the infrastructure are critical to given services, or which services are dependent on, or could have an effect on a given part of the infrastructure. The dependencies or effects can encompass reachability information. The use of a model having links and nodes can enable more efficient processing, to enable larger or richer models. What changes in the dependencies or effects result from a given change in the network can be determined (830). Other variations can be conceived within the scope of the claims.

The invention claimed is:

1. A method of using a data model of a network infrastructure comprising: making an alteration in the data model of a number of application services; making a representation in the data model of one or more alterations in the network infrastructure, the data model comprising nodes to represent parts of the network infrastructure, and comprising links to represent how the nodes influence each other; and automatically deriving from the data model changes in security properties of the network infrastructure resulting from the alteration; determining the security properties of the altered data model of the application services; and comparing the security properties of the application services before the alteration in the data model with the security properties after the alteration.

2. The method of claim 1, further comprising determining paths through the nodes and links of the data model.

3. The method of claim 1, in which the data model comprises a representation of application services arranged to use the network infrastructure, and the method further comprises deriving changes in the security properties resulting from a given alteration in the network infrastructure or in the application services.

4. The method of claim 1 further comprising using the data model to assess candidate alterations to the network infrastructure or application services to enable a given security property.

5. The method of claim 1, in which comparing the security properties of the application services before the alteration in the data model with the security properties after the alteration comprises deriving the changes between the security properties of the application services before the alteration and the security properties after the alteration.

6. The method of claim 1, in which making the representation of the alterations comprises creating at least a second instance of the data model, comprising a representation of one or more candidate alterations, and in which deriving the changes comprises determining the security properties from the instances, then comparing these properties.

7. The method of claim 1, the security properties comprising any of the following; what parts of the network are reachable from a given point or part of the network with an existing configuration, what parts of the network are reachable from a given point or part of the network if the configuration is altered, what security controls exist between given points or regions of the network, and what security controls exist in new paths created between given points or regions of the network if the configuration is altered.

8. The method of claim 1, in which the data model comprises a database of object oriented elements representing the nodes, and in which the method further comprises searching the database for logical paths through the data model, which match given constraints.

9. The method of claim 8, in which the database comprises object oriented elements representing the links.

10. The method of claim 8, further comprising creating an object representing at least one logical path through two or more links of the data model.

11. The method of claim 8, the searching comprising making a recursive query of the database.

12. The method of claim 8 further comprising receiving and classifying information about the network infrastructure or application services, to add to the model, or normalizing a path query with reference to class definitions of the data model.

13. A method of using a data model of a network infrastructure and application services arranged to use the network infrastructure, the data model comprising nodes to represent parts of the network infrastructure and the application services, and links to represent how the nodes influence each other, comprising: finding paths through the nodes and links of the data model; automatically deriving security properties of at least the application services from the determined paths; deriving from the data model alterations in the network infrastructure which enable a given change in the security properties; making an alteration in the data model of the application services; determining the security properties of the altered data model of the application services; and comparing the security properties of the application services before the alteration in the data model with the security properties after the alteration.

14. The method of claim 13, further comprising using the data model to derive changes in the security properties resulting from a given alteration in either the network infrastructure or the application services.

15. The method of claim 14, in which deriving the changes in the security properties comprises determining the security properties before making a representation in the data model of the given alterations in either the network infrastructure, then repeating the determining of security properties, and comparing these properties.

16. The method of claim 13, the security properties comprising any of the following; what parts or regions of the network infrastructure or application services are reachable from a given point or part of the network infrastructure or application services with an existing configuration, what parts or regions are reachable if the configuration is altered, what security controls exist between given points or regions, what security controls exist in new paths created between given points or regions if the configuration is altered, reachability of a given application service, and effect of a given application service on reachability of other parts.

17. The method of claim 13, in which the data model comprises an indication of criticality of a node or link to a given one or more of the application services, and further comprises determining security properties comprising any of; determining which nodes or links to include in a search of the data model, according to the indication of criticality, determining which nodes and links in the data model can be affected by a given one or more of the application services, and sorting the security properties according to the indication of criticality.

18. The method of claim 13, the model comprising a database of object oriented elements representing the nodes, and the method further comprising searching the database for logical paths through the data model, which match given constraints.

19. The method of claim 18, in which the database comprises object oriented elements representing the links.

20. The method of claim 18, further comprising creating an object representing at least one logical path through two or more links of the data model.

21. The method of claim 18, the searching comprising making a recursive query of the database.

22. The method of claim 18, further comprising receiving and classifying information about the network infrastructure or application services, to add to the data model, or normalizing a path query with reference to class definitions of the data model.

23. A database stored on a storage medium comprising: a model of at least a portion of a network, the model comprising: nodes to represent parts of the network infrastructure and the application services, links to represent how the nodes influence each other, in which the model is arranged such that dependencies or effects of the application services can be determined from paths through the nodes and links of the model, and in which the model indicates changes in security properties of the network infrastructure resulting from an alteration in the network infrastructure, in which the storage medium stores: data representing an alteration made to the model of the application services; data representing security properties of the altered model of the application services; and data representing a comparison between the security properties of the application services before the alteration in the model with the security properties before the alteration.

24. A method of using a data model of application services, the data model comprising nodes to represent a portion of the application services, and links to represent how the nodes influence each other, at least the links being represented by object oriented elements comprising:
  determining paths through the nodes and links of the data model;
  deriving security properties of the application services from the paths;
  making an alteration in the data model of the application services;
  determining of the security properties of the altered data model of the application services; and
  comparing the security properties of the application services before the alteration in the data model with the security properties after the alteration.

25. The method of claim 1, further comprising automatically deriving from the data model alterations in the network infrastructure which can enable a given change in the security properties.

* * * * *